(12) United States Patent
Dehlsen et al.

(10) Patent No.: US 12,012,924 B2
(45) Date of Patent: Jun. 18, 2024

(54) FIXED AND PITCHING BLADES, SPAR SHAFT, BEARINGS AND MATERIALS FOR MARINE CURRENT TURBINE

(71) Applicant: Aquantis, Inc., Santa Barbara, CA (US)

(72) Inventors: James George Purnell Dehlsen, Santa Barbara, CA (US); Peter Stricker, Santa Barbara, CA (US); Ole Kils, Santa Barbara, CA (US); Tyler Mayer, Santa Barbara, CA (US); Henry Swales, Santa Barbara, CA (US)

(73) Assignee: Aquantis, Inc., Santa Barbara, CA (US)

( * ) Notice: Subject to any disclaimer, the term of this patent is extended or adjusted under 35 U.S.C. 154(b) by 0 days.

(21) Appl. No.: 17/688,772

(22) Filed: Mar. 7, 2022

(65) Prior Publication Data

US 2022/0341386 A1  Oct. 27, 2022

Related U.S. Application Data

(60) Provisional application No. 63/157,464, filed on Mar. 5, 2021.

(51) Int. Cl.
*F03B 3/14* (2006.01)

(52) U.S. Cl.
CPC .......... *F03B 3/145* (2013.01); *F05B 2210/11* (2013.01); *F05B 2240/30* (2013.01); *F05B 2260/79* (2013.01)

(58) Field of Classification Search
CPC ........ F03B 3/145; F03B 17/061; F03B 11/06; F05B 2210/11; F05B 2240/30; F05B 2260/79; F05B 2230/60; F05B 2240/53; F04D 29/181; Y02E 10/30; Y02E 10/72; B63H 3/00; B64C 11/30
See application file for complete search history.

(56) References Cited

U.S. PATENT DOCUMENTS

2005/0285407 A1\* 12/2005 Davis ...................... F03B 3/128
290/54

FOREIGN PATENT DOCUMENTS

| CN | 103397980 A | * | 11/2013 | |
| WO | WO-2009094998 A2 | * | 8/2009 | ............. F03B 11/06 |
| WO | WO-2013079638 A1 | * | 6/2013 | ............ F03B 13/264 |

\* cited by examiner

*Primary Examiner* — Juan G Flores
*Assistant Examiner* — Eric A Lange
(74) *Attorney, Agent, or Firm* — Trevor Coddington; Akerman LLP

(57) ABSTRACT

A marine current turbine rotor comprises a hub and fixed and two or more pitchable blade sections configured to reduce bending moment loads on the pitch bearings and enable the use of non-standard, low-cost structural materials for the hub, blades, and pitch shaft. A submersible pitch drive mechanism or linkage in the hub rotates the pitch shaft to cause the pitchable blade section to move to a specified pitch position. The hub cavity is configured to be "wet" without the expense and maintenance requirement of seals to prevent water intrusion, utilizing water-lubricated pitch bearings.

19 Claims, 8 Drawing Sheets

3-blade configuration    4-blade configuration

FIXED AND PITCHING BLADES, SPAR SHAFT, BEARINGS AND MATERIALS FOR MARINE CURRENT TURBINE

BACKGROUND OF THE INVENTION

1. Field of Invention

The present invention relates to marine current turbines.

2. Description of Related Art

Ocean and tidal currents are a major, mostly untapped marine energy resource in a class of renewable energy resources known as "marine hydrokinetic" or "MHK" energy. The potential for marine current electric power generation in the United States is as much as 185 TWh/yr, comprising both tidal and gyre currents, which have the advantage of delivering clean, renewable, predictable electric power to the coastal transmission grid, which are often close to high load centers. Research and development in this area are driven by the need to generate electricity from renewable energy resources, particularly given the rising level of $CO_2$ and methane in the earth's atmosphere from the combustion of carbon fuels and the resulting disruptive impact on climate from global warming.

This emerging MHK energy sector requires new, low-cost, reliable approaches to marine rotor and turbine design. Tidal and ocean gyre current turbines experience higher thrust loading relative to wind turbines of a similar rating. The operational environment is also severe where submerged operation with difficult access makes reliability a key concern. The current state-of-the-art for rotor, pitch, and hub systems for marine energy is very similar to the systems commonly used in utility-scale wind turbines. Several key challenges exist in adapting such a pitch system to an MHK turbine.

Wind turbine pitch systems and blades experience a high rate of failure relative to other turbine components. The cost of offshore maintenance and repair for current/tidal turbines is significantly higher than onshore wind turbines; therefore, a competitive price of energy for MHK turbines necessitates a new approach that achieves long-term reliability. Further, the high loads experienced by ocean current turbines have driven MHK blade and hub designs to utilize expensive composite materials and wind turbine-type pitch bearings and drives, resulting in high capital costs that keep MHK turbines economically uncompetitive with other forms of renewable energy.

The rolling, metallic blade root bearings commonly used are very susceptible to seawater contamination and corrosion. Even minuscule amounts of seawater leakage of the seals will cause lubricant degradation and early failure of these slewing bearings and may require a bilge and automated lubrication system to enable extended service.

MEM blades are also a more highly loaded structure than wind turbine blades, and their standard bolted connection and slewing bearings require a large diameter to distribute the blade root loads. The bearing connections must resist extremely high bending moment loads and need a high-strength steel hub concentrated at the hub-to-blade-root-bearing interface to withstand those loads. Conventional blades that transition to a large diameter, cylindrical root cannot extract energy from that inner portion of the swept area. Further, to actuate these full-span blades' pitching, the actuator must overcome both hydrodynamic and inertial resistance to the pitching movement, which requires high pitching torque and tends to limit the speed of actuation.

SUMMARY OF THE INVENTION

The present invention overcomes these and other deficiencies of the prior art by providing a novel, integrated fixed blade hub with pitching blade sections that addresses the challenges of submerged pitching marine current turbine rotors. The component and system design reduces stresses in the hub and pitch bearings, improves energy capture by enabling blades that extend the hydrodynamic span of the blade toward the hub, reduces cost by reducing critical stress allowing the use of less costly materials than current state-of-the-art fiber-reinforced polymer (FRP) blade materials and less expensive bearings, and improves component reliability by eliminating sealing and lubricating requirements and a bolted blade root connection.

A key feature of the integrated, novel hub-blade design is the spar pitch shaft borne by spread pitch bearings in the fixed blade section of the fixed blade hub. Beyond the outer pitch bearing, the spar pitch shaft enters into and is integrated with the pitching blade section structure, acting as its central spar beam. The transition from fixed blade section to pitching blade section is made at a certain rotor radius where variable pitching begins. The freely rotating spar pitch shaft extends axially through the fixed blade section where pitch bearings are mounted to react shear and moment loads and restrict axial motion while facilitating rotation of the spar pitch shaft.

The spar pitch shaft connects to a pitch drive mechanism within the fixed hub that drives the pitching blade section's angular position. At the separation point between the fixed blade section and the pitching blade section, the fixed and pitching blade profiles align with each other at a prescribed pitch position, which achieves optimum performance over the range of operating flow velocities. Between zero and rated current velocity, the pitching blade section's pitch angle may be adjusted to attain maximum performance for the existing current velocity. Above rated current velocity, the pitching blade section de-pitches to not exceed rated power. On turbine shutdown, the pitching blade section feathers to offload the marine current's kinetic energy from the rotor. During shutdown, the pitching blade profile can vary by about 90 degrees from the fixed blade section. The radius where the fixed and pitching blade sections adjoin is determined through an optimization process that considers blade-hub structure hydrodynamic performance, equipment lifetime, capital costs, and maintenance costs.

This spar pitch shaft and spread pitch bearings significantly reduce bearing stresses compared to a conventional blade root bearing arrangement. The blades use seawater lubricated pitch bearings, eliminating the need for large diameter seals and complex lubrication systems.

The use of reinforced cementitious materials, such as geopolymer concrete, for the fixed blade hub, the pitching blade section, and the spar pitch shaft is novel. The spar pitch shaft may be configured as a tube or box beam within the pitching blade section and may be fabricated from composite reinforced geopolymer concrete with basalt fiber or other suitable reinforcement material. In another embodiment, the spar pitch shaft is configured as a metal tube filled with geopolymer concrete, such as a concrete-filled steel tube (CFST), to enhance its bending strength and provide longitudinal stiffness to the pitching blade section. Other cementitious materials, including lightweight aggregate concrete (LWAC) and formulations utilizing silica fume, fly ash, ground granulated blast furnace slag, metakaolin, and other binders and additives may be used as alternatives to geopolymer concrete.

The novel hub and blade bearing arrangement in a two-bladed embodiment of the invention can be either a common spar axis (coaxial blades) or use a side-by-side parallel blade axis that spreads the separation of blade bearings across the hub diameter and centers the bearing loads on the neutral hub axis, increasing structural efficiency and reducing weight. A similar hub configuration can be implemented for a plurality of blades using polygons of increasing spar pitch shaft counts (triangular arrangement for three-bladed, rectangular arrangement for four-bladed, etc.).

The foregoing and other features and advantages of the present invention will be apparent from the following, a more detailed description of the present invention's preferred embodiments and the accompanying drawings.

BRIEF DESCRIPTION OF THE DRAWINGS

For a complete understanding of the present invention, the objects, and advantages thereof, reference is now made to the ensuing descriptions taken in connection with the accompanying drawings briefly described as follows.

DETAILED DESCRIPTION OF PREFERRED EMBODIMENTS

Figure 1:
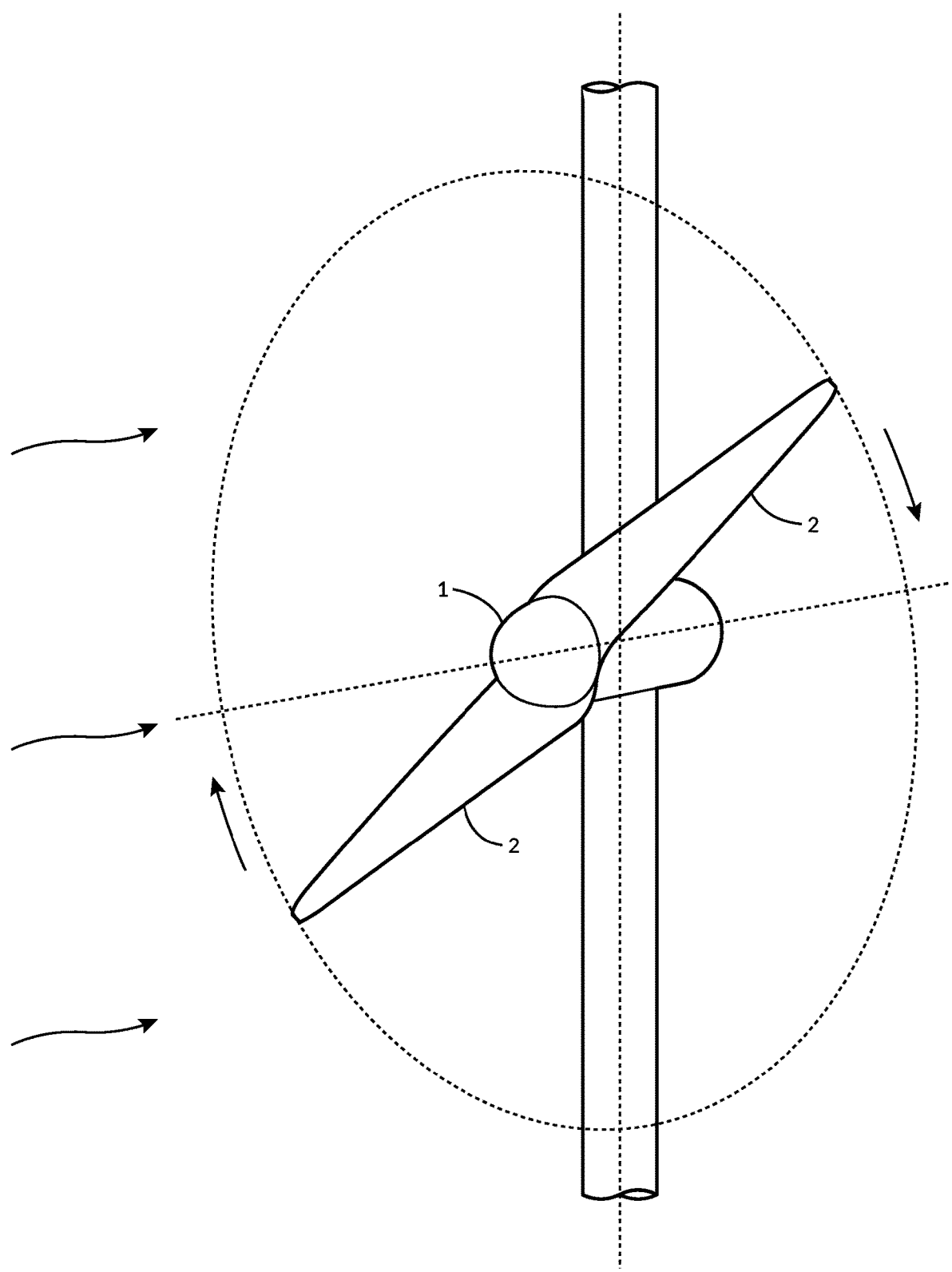
FIG. 1 shows a view of an upstream-facing marine current turbine.

Preferred embodiments of the present invention and their advantages may be understood by referring to FIGS. 1-8. The described features, structures, or characteristics of the invention may be combined in any suitable manner in one or more embodiments. It will be apparent to those skilled in the art that various modifications and variations can be made to the present invention without departing from the invention's spirit and scope. Thus, it is intended that the current invention cover modifications and variations consistent with the scope of the appended claims and their equivalents.

The present invention provides a turbine rotor and hub that eliminates many costly and maintenance-intensive components while maintaining equivalent functionality, improved reliability, and increased performance. The advanced rotor design has no shaft seals around the blade root and no contamination-sensitive oil-lubricated bearings. The blade does not compromise a hydrofoil transitioning to a cylindrical shaft attached to a bearing at the blade root and it is not connected to the root by highly loaded, pre-tension-sensitive T-bolts, which requires periodic re-tensioning.

The invention comprises a monolithic, hydrodynamically-profiled spar within the fixed-pitch blade section ("fixed blade section") extending radially outward in the rotor plane from a central fixed hub ("fixed hub") to a radius on the blade span from which the variable pitch blade section ("pitching blade section") extends, supported by separate bearings ("pitch bearings") on a rigid pitch shaft ("spar pitch shaft") within the fixed blade section. These pitch bearings have sufficient separation to greatly spread the moment loads on the spar pitch shaft.

The use of a monolithic structure comprised of fixed blade sections and fixed hub ("fixed blade hub") with independent pitching blade sections enables, i) alternative structural materials, designs, and fabrication processes to be implemented for the fabrication of the fixed blade hub, spar pitch shaft and pitching blade sections, ii) reduced pitch bearing moment loads with a smaller active pitching blade section, iii) the use of spread bearings to support the spar pitch shaft, iv) reduced torque capacity requirement for the pitching system, iii) the use of water-lubricated bushings or bearings (in following references, "pitch bearings" will refer to bearings or bushings interchangeably), and v) the use of a wet/flooded hub interior precluding the need for seals. The invention comprises a fixed blade section at the inner (root) region and an active pitching blade section located outward on the rotor radius, where higher blade translational velocities increase the need to adjust pitch angle to optimize hydrodynamic efficiency and manage blade loading when the turbine is operating at capacity in fast-moving currents. The hydrodynamic profile of the fixed blade section provides added hydrodynamic lift during operation. The rotor/machine may be stopped from generating power due to spoiled lift of the pitching blade section and increased drag that opposes lift produced by the fixed blade section by feathering the pitching blade section.

Conventional blades require large diameter blade root bearings to support moment loads at the hub, however, the novel fixed hub combined with the fixed blade sections carrying the blade root loads provides two moment loading benefits. First, it reduces the length of the active, pitching blade section by assigning a portion of the blade length to the fixed blade section. It reduces the moment loading on the pitch bearings compared with conventional, full-length pitching blades, which present greater active blade area. Second, the fixed blade sections provide an extended, rigid structure to support at least two pitch bearings per spar pitch shaft. The bearings, which are spaced apart from each other, react the moment and shear loads produced by the pitching blade section, instead of concentrating such loads on a single, highly loaded slewing-ring bearing at the blade root practiced with conventional blade designs.

The present invention provides several other key features. Pitch rotation of the spar pitch shaft through water-lubricated bushings or bearings eliminates the need for sealed, corrosion-prone roller bearings at the blade root. The reduced inertia and pitching force associated with a shorter pitching blade section, compared with conventional, full-length pitching blades, reduces loads on the pitch system, which allows for increased pitching duty-cycles and increased life of the pitch system. This factor may be crucial when considering the high duty-cycle associated with two pitch changes per rotor revolution to compensate for velocity shear in the flow profile of a tidal or ocean current turbine site.

In addition, the spar pitch shaft design eliminates the need for the cylindrical blade root transition to accommodate a conventional, large diameter slewing-ring bearing. This extends the fixed blade sections' effective hydrodynamic span to increase energy capture from the rotor's central area, with flow acceleration by deflection of flow around the turbine hub and nacelle. The fixed blade hub provides beam support for spar pitch shafts inserted into the fixed blade sections that carry bending moment and shear loads from the pitching blade sections, nominally balancing the loads from each blade against each other. The fixed blade hub can be produced as a single structure, optimized for cost-efficiency, structural integrity, and hydrodynamic performance. The relative length of the fixed blade sections and the pitching blade sections may be optimized for capital cost, lifetime of fixed and articulating components, operations and maintenance costs, and hydrodynamic performance.

With reduced critical bending moment stresses, lower cost, corrosion-resistant structural materials, such as geopolymer concrete composites with basalt or other reinforcing materials, may be used to fabricate the fixed blade hub. This presents a further distinction from ocean current blade designs based on conventional wind turbine blades, where blade mass contributes to gravity-induced "lead-lag" loads on the blade roots and bearings on every revolution of the rotor. In the case of a blade submerged in water, the buoyancy force opposes the gravitational force so that for a material such as geopolymer concrete, which could be too massive to consider for a wind turbine blade, neutral buoyancy may be achieved, thus resulting in minimal lead-lag loads.

Offsetting buoyancy also enables the spar pitch shaft to be designed as a geopolymer-concrete-filled metal tube, similar to the concrete-filled-steel-tubes (CF ST) utilized in the construction industry, thus significantly increasing stiffness and bending strength over an unfilled tube without increasing its outside dimensions. Installation/replacement of the pitching blade section requires less lifting and handling capability than needed to replace a conventional blade, and the "stabbing" of the spar pitch shaft into the pitch bearings of the fixed blade hub allows for blade installation/changeout with far less effort than removing conventional slew-ring blade root T-bolts and handling a full-length blade. Marinized pitch actuators and seawater-lubricated bushings or bearings allows the inside volume of the hub to be flooded, eliminating the need for seals and lubricants harmful to marine life FIG. 1 illustrates a perspective view of an upstream-facing marine current turbine (MCT) according to an embodiment of the invention. The MCT comprises a central hub (1) and two hydrodynamically shaped blades (2) designed to create lift from current flows, thereby converting translational kinetic fluid force into rotational torque to turn a main shaft (not shown). Also not shown are the gearbox and generator being driven by the rotating main shaft to produce electric power, the implementation of which is apparent to one of ordinary skill in the art.

Figure 2:
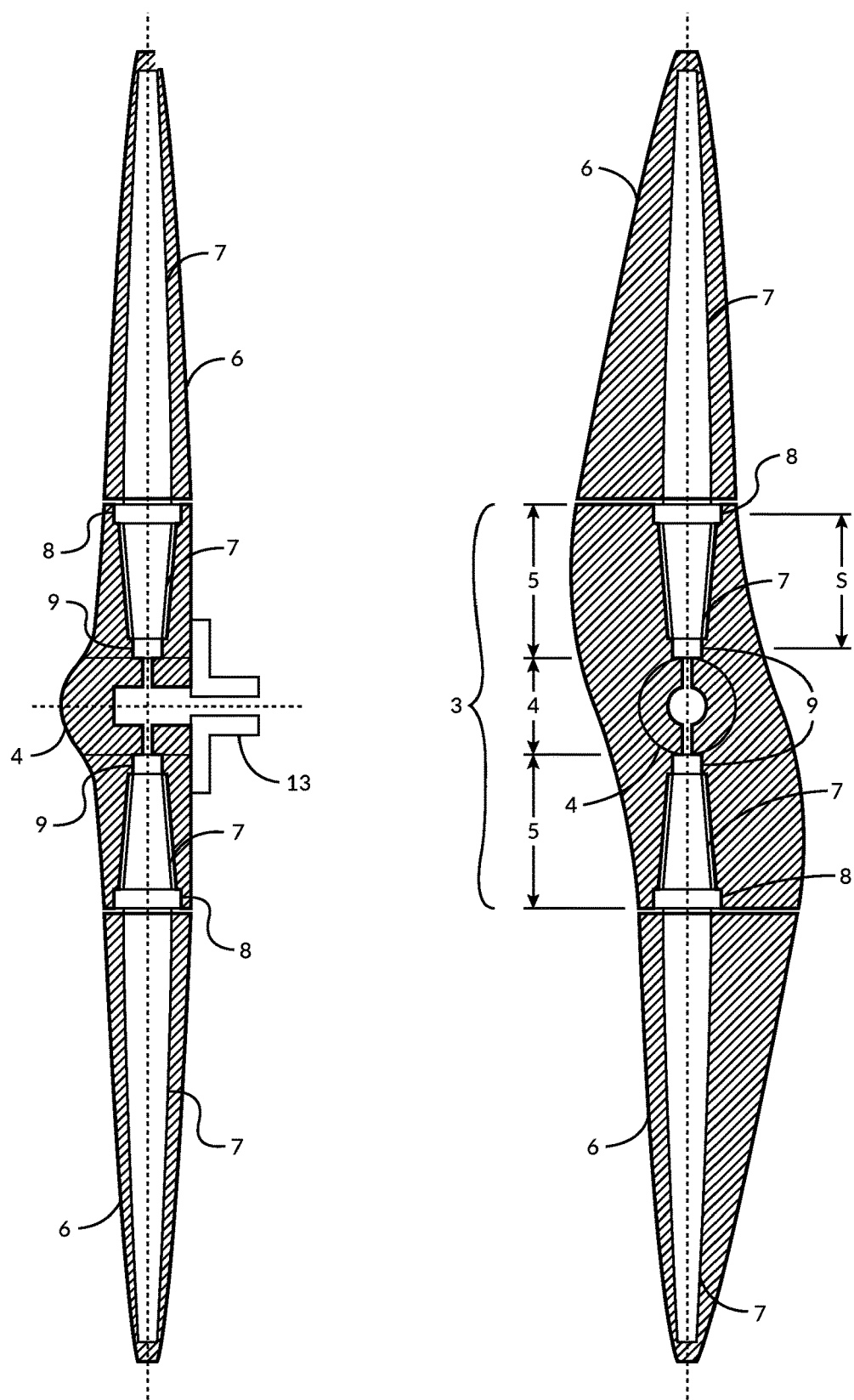
FIG. 2 depicts side and front views of a vertically oriented rotor with fixed and pitching blade sections.

Referring to FIG. 2, which illustrates a side view and a front view of the central hub (1) and a hydrodynamically shaped blade of the MCT, a fixed blade section (5) and a pitching blade section (6) are connected by spar pitch shaft (7), which enables the pitching blade section (6) to rotate about its longitudinal axis with respect to the fixed blade section (5). The spar pitch shaft (7) passes through the fixed blade section (5) along its longitudinal axis, supported by an outer pitch bearing (8) and an inner pitch bearing (9) mounted within the fixed blade section to allow free rotation of the spar pitch shaft (7) while providing restraint from axial displacement. The distal region of the spar pitch shaft (7) is embedded within and affixed to the pitching blade section (6), providing longitudinal structural support as a spar beam for the pitching blade section (6) and torsional communication from the pitch drive (not shown) in the fixed hub (4) so that rotation of the spar pitch shaft (7) causes rotation of the pitching blade section (6) resulting in a change of pitch angle. The spar pitch shaft (7) is rotated with an electric or hydraulic pitch drive (not shown) located in the fixed hub (4) or may be activated by a linkage mechanism (not shown) connected through the turbine main shaft (13). The pitch system is designed to rotate the spar pitch shaft (7) over a range of 90 degrees against inertial, friction, and hydrodynamic torque loads for the pitching blade section (6) to achieve or maintain a desired angular pitch position.

Two blades, each comprising of a pitching blade section (6) and a fixed blade section (5), emanating from the fixed hub (4) directly opposite each other, experience drag and thrust loads imposed on their upstream facing surfaces that are nominally counterbalanced by each blade relative to the other. This alignment of two fixed blade sections across the hub enables the combined structure (fixed blade hub) (3) to perform as a rigid beam resisting bending loads imposed on the blades by the water flow. The monolithic fixed blade hub (3) allows for novel materials such as geopolymer concrete with basalt fiber reinforcement or other reinforced cementitious materials to be used in the fabrication of this structure, as well as for the spar pitch shaft (7) within the pitching blade section (6). In another embodiment, the spar pitch shaft (7) is constructed as a metal tube filled with a cementitious material such as geopolymer concrete or Portland cement to enhance its stiffness and bending strength. The pitch bearings (8 and 9) in each fixed blade section (5) are separated by a "spread distance" (S) that reduces the tangential bearing reaction forces from pitching blade section (6) moment loads, in direct proportion to the spread distance (S).

The pitch bearings (8 and 9) are water-lubricated to avoid the need for sealing against seawater intrusion and eliminate maintenance requirements of an oil-based lubrication system. The fixed hub (4) cavity is similarly designed to be a wet environment to avoid the need for seals on the spar pitch shaft (7) penetrations in fixed blade hub (3). The pitch drive (not shown) is a submersible, electric or hydraulic device contained within the fixed hub (4) and commanded through the main shaft (13), or may be an arrangement of linkages driven through the turbine main shaft (13) (not shown).

Figure 3:
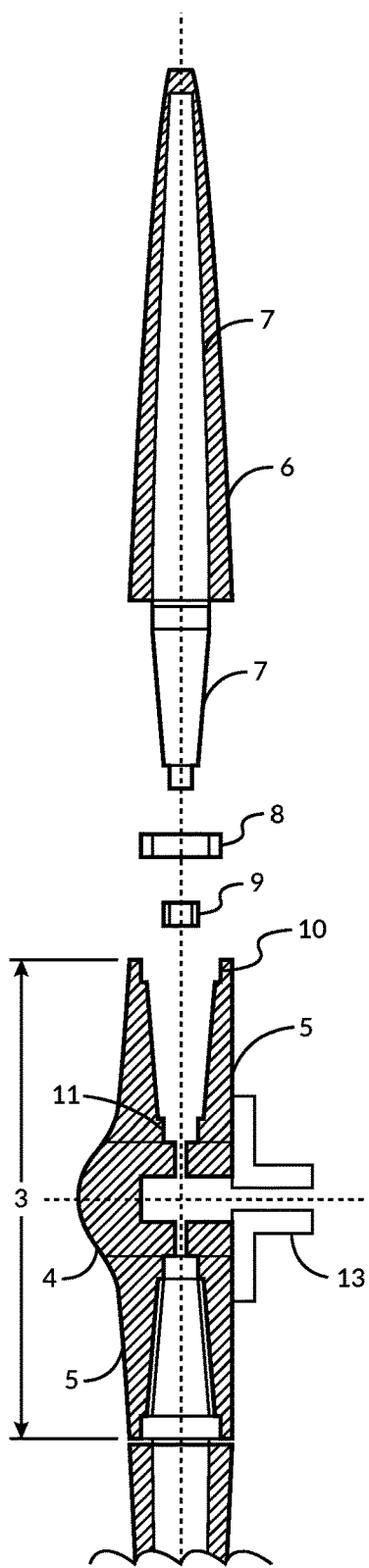
FIG. 3 shows an exploded view of a fixed blade hub, spar pitch shaft, and pitch bearings.

As shown in FIG. 3, assembly or replacement of the pitching blade section (6) is facilitated by insertion and removal of the pitch shaft (7) through the pitch bearing (8) (seated into bearing pocket (10)) and into pitch bearing (9) (seated into bearing pocket (11)) within the fixed blade section (5), without requiring bolt tensioning of multiple flange or T-bolts around the blade root, as commonly practiced with full-pitch wind or tidal turbine blades.

Figure 4:
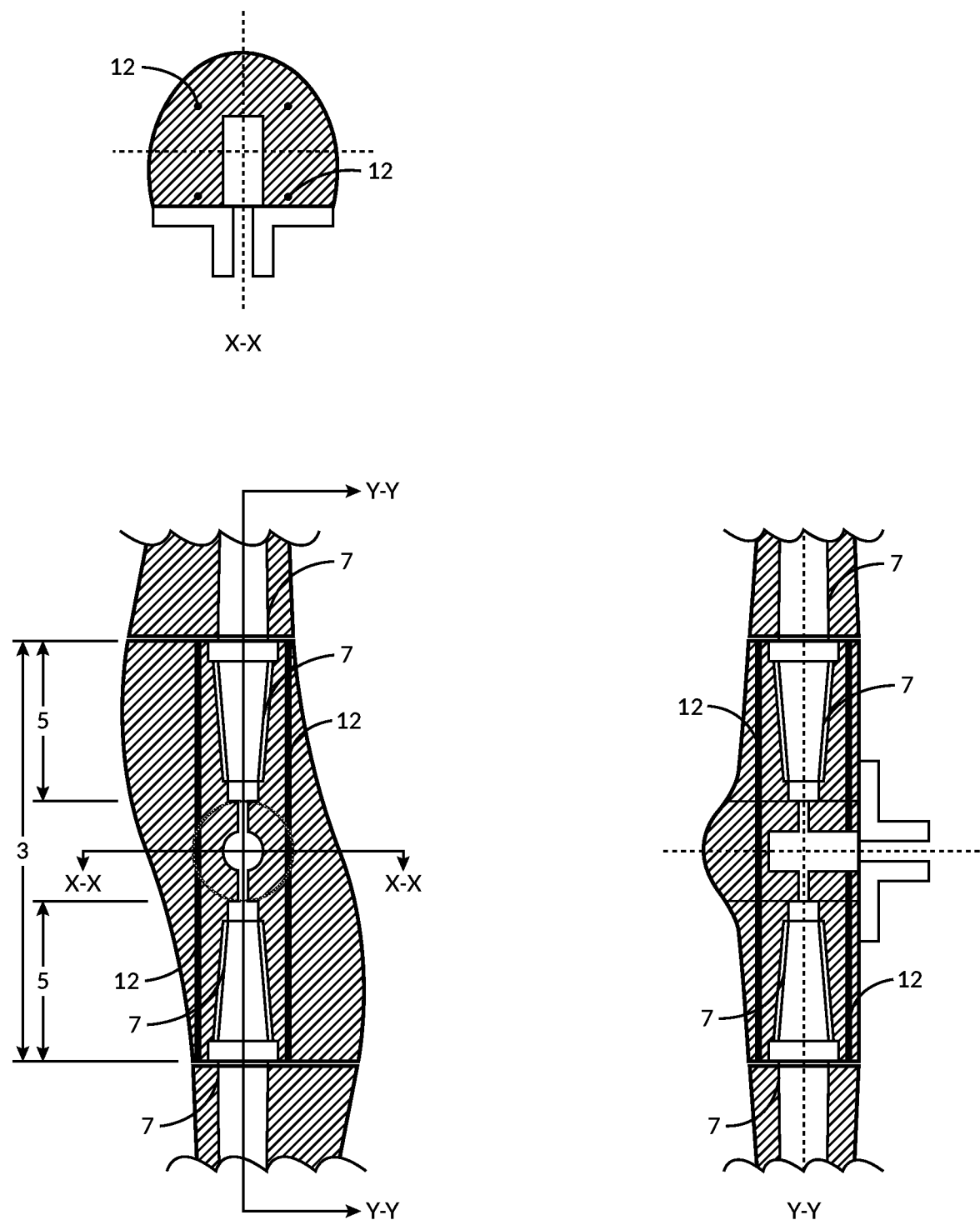
FIG. 4 shows a front view and two cross-section views of a fixed blade hub with reinforcement bars.

FIG. 4 illustrates front and cross-sectional views of a preferred embodiment of the fixed blade section (5) and monolithic fixed blade hub (3) that enables casting, molding, or printing of a single structure from low-cost cementitious materials, including geopolymer concrete and other cost-effective materials. Tensile reinforcement bars or rods (12), made of basalt fiber or other suitable tensile material, may be embedded in the cementitious material used in the fixed blade hub (3) to withstand the bending-induced tensile loads and shear loads of the marine current on the blades. The spar pitch shaft (7) passes through the fixed blade section (5) in a cavity.

Figure 5:
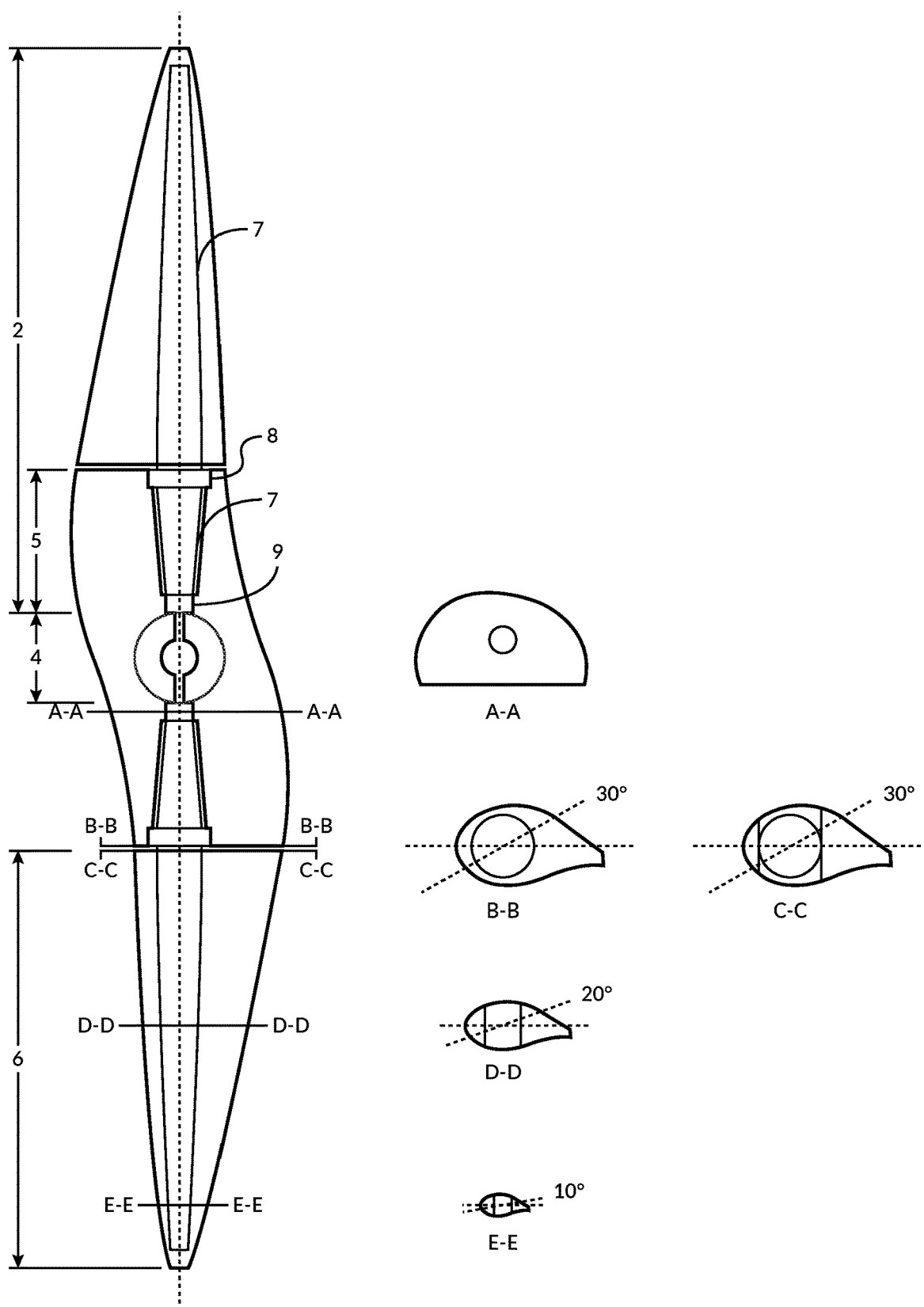
FIG. 5 shows a front view and cross-section views of fixed blade section and pitching blade section hydrodynamic profiles.

FIG. 5 depicts cross-sections A-A, B-B, C-C, D-D, and E-E with their respective hydrodynamic profiles. Cross-sections A-A and B-B represent portions of the hydrodynamic profile of the fixed blade section (5); cross-sections C-C, D-D, and E-E indicate the hydrodynamic profile of the pitching blade section (6) that form a continuum of the hydrodynamic shape of the blade (2). Blade twist is indicated at the section planes; for example, 30° at B-B and C-C, 20° at D-D, and 10° at E-E. The blade (2) has an additional hydrodynamically active area in the fixed blade section (5) between blade profiles A-A and B-B that is enabled by replacing the large diameter root bearing connection of a conventional blade with the spar pitch shaft (7) supported by spread bearings (8 and 9). The preferred embodiment allows the blade shape to be hydrodynamically optimized from the tip of the pitching section (6) to the fixed hub (4).

Figure 6:
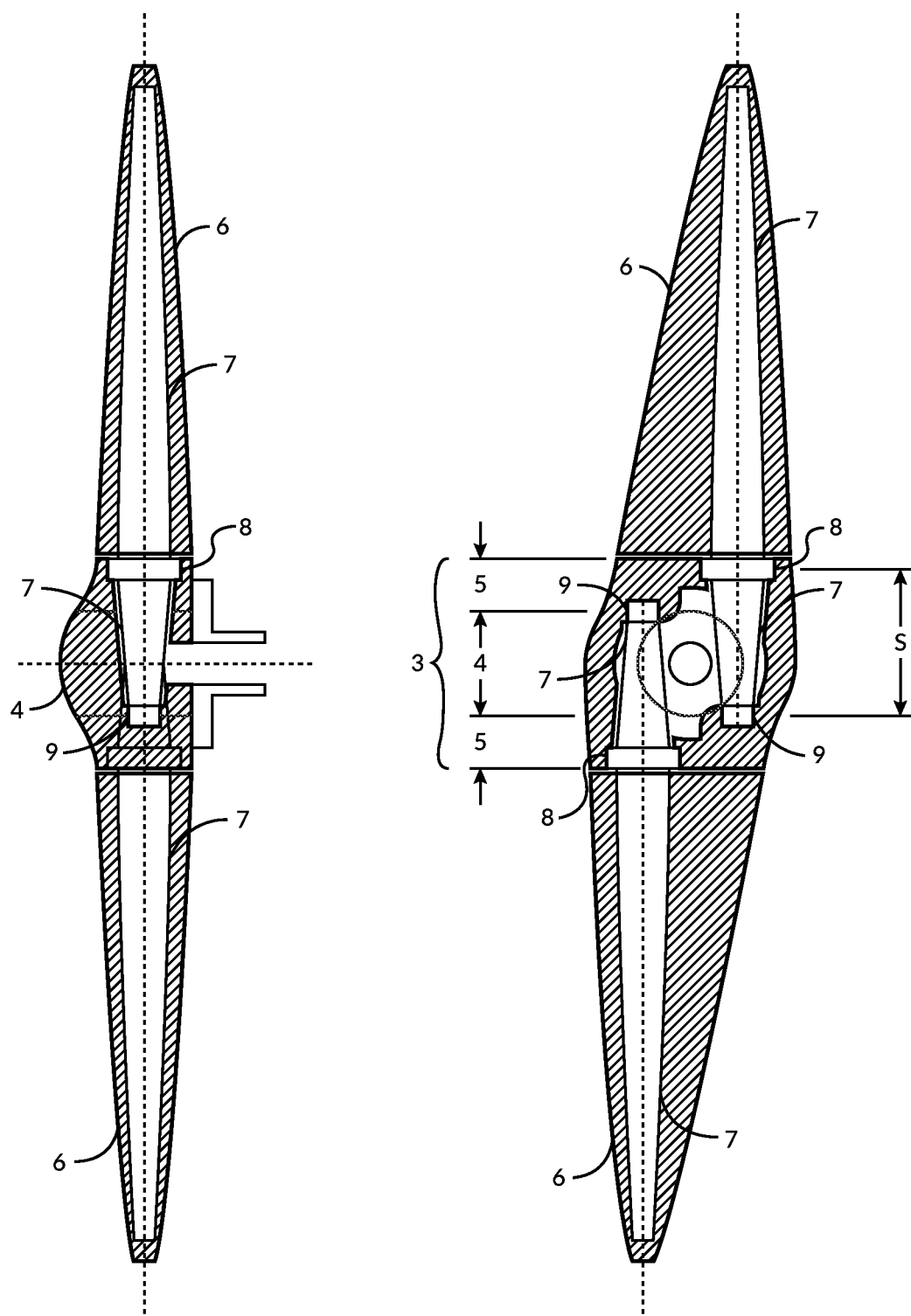
FIG. 6 depicts front and side views of a rotor in a cross-section with fixed and pitching blade sections whereby pitch shafts are arranged side-by-side.

FIG. 6 conveys an additional embodiment whereby two pitching blade sections (6) are not aligned coaxially and instead are arranged so that their spar pitch shafts (7) enter the fixed blade hub (3) adjacent and parallel to each other. Further to this embodiment, the proximal ends of the spar pitch shafts (7) span the width of the fixed hub (4), providing separation for the pitch bearings (8 and 9). This embodiment allows the length of the fixed blade section (5) to be minimized while continuing to provide spread distance (S) to react the moment loads induced in the spar pitch shaft (7) by the pitching blade section (6). Torque induced by the current on the blades is offset, one pitch shaft against the other, across the axis of the hub, providing added structural efficiency.

Figure 7A:
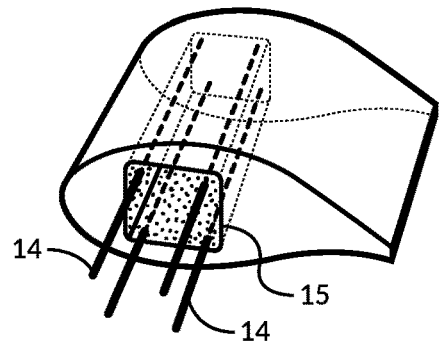
FIG. 7a shows cut-away section views of three alternative constructions of spar pitch shafts and cementitious materials within a pitching blade section.
Figure 7B:
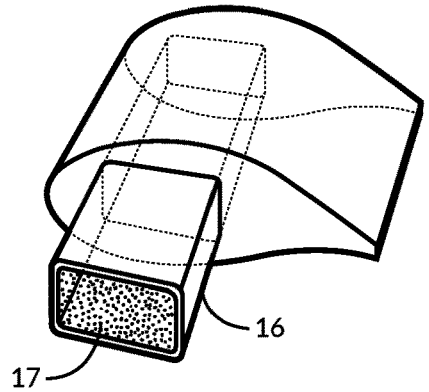
FIG. 7b shows a steel tube filled with cementitious material and serving as the structural main beam of the blade.
Figure 7C:
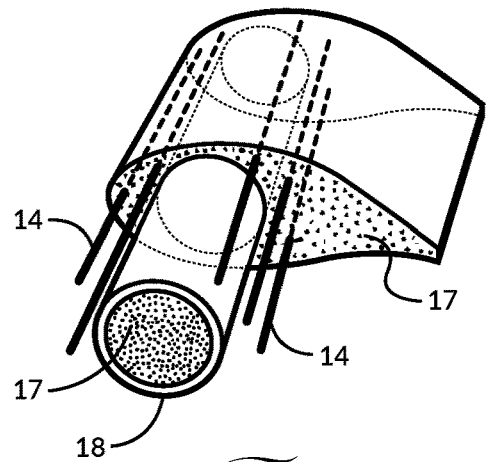
FIG. 7c shows the blade structure combining a steel tube filled with cementitious material and surrounded by cementitious material within the blade skin with reinforcement rods.

FIGS. 7a-7c illustrate three embodiments of spar pitch shaft (7) forms within the pitching blade section (6). FIG. 7a shows a composite cementitious beam (15) utilizing a material such as geopolymer concrete with reinforcement rods (14) such as basalt rebar. FIG. 7b illustrates a steel tube (16), which may be rectangular as shown, or round or oval in profile (not shown), filled with a cementitious material (17) and serving as the structural main beam of the blade. FIG. 7c shows the blade structure combining a steel tube (18) filled with cementitious material (17) (or, in an additional embodiment not shown, not filled with cementitious material) and surrounded by cementitious material (17) within the blade skin with reinforcement rods (14) such as basalt rebar, for example, on the tensile side (high-pressure surface) of the blade. In each case, as illustrated in FIG. 3, the portion of the spar pitch shaft (7) that protrudes from the pitching blade section (6) and is inserted into the fixed blade section (5) through pitch bearings (8 and 9) is circular cross-section regardless of its profile within the pitching blade section (6).

Figure 8:
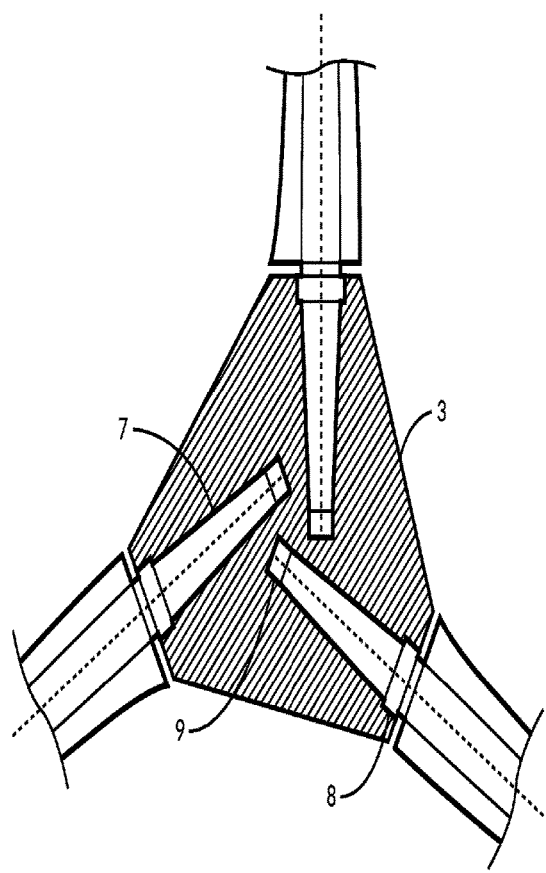
FIG. 8 illustrates spread pitch bearing configurations for 3- and 4-bladed rotors.
Figure 8:
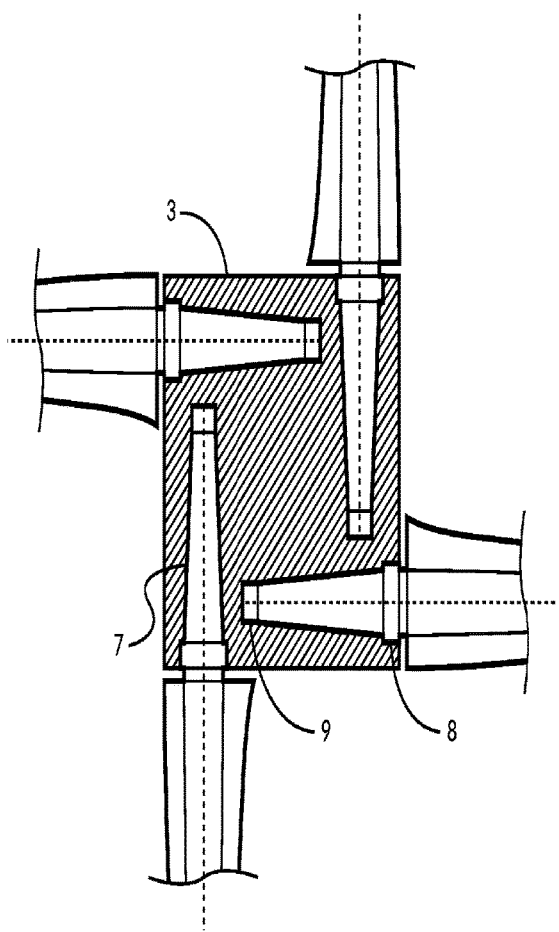

FIG. 8 illustrates further embodiments of the fixed blade hub (3) and spar pitch shafts (7) with spread bearing (8 and 9) arrangements with adjacent, non-coaxial spar pitch shafts (7) in three- and four-bladed embodiments.

The invention has been described herein using specific embodiments for illustration only. However, it will be readily apparent to one of ordinary skill in the art that the principles of the invention may be embodied in other ways. Therefore, the invention should not be regarded as limited in scope to the specific embodiments and claims.

We claim:

1. A variable pitch, hub, and rotor system for a marine turbine comprising: a monolithic fixed blade hub comprising a central fixed hub and a first fixed blade section and a second fixed blade section, a first blade comprising a first pitching blade section connected to the first fixed blade section by a first spar pitch shaft, wherein the first spar pitch shaft enables the first pitching blade section to rotate about its longitudinal axis relative to the first fixed blade section; a second blade comprising a second pitching blade section adjoined to the second fixed blade section and a second spar pitch shaft passing through the second fixed blade section, wherein the second spar pitch shaft enables the second pitching blade section to rotate about its longitudinal axis relative to the second fixed blade section; and the first fixed blade section and the second fixed blade section each comprise a water-lubricated outer pitch bearing and a water-lubricated inner pitch bearing to allow free rotation of the respective spar pitch shaft.

2. The variable pitch, hub, and rotor system according to claim 1, wherein the monolithic fixed blade hub is made of a moldable cementitious material with one or more reinforcement rods.

3. The variable pitch, hub, and rotor system according to claim 1, wherein the first spar pitch shaft and the second spar pitch shaft each comprise a cementitious material with one or more reinforcement rods.

4. The variable pitch, hub, and rotor system according to claim 1, wherein the first spar pitch shaft and the second spar pitch shaft each comprise a metal tube filled with cementitious material.

5. The variable pitch, hub, and rotor system according to claim 4, wherein the first pitching blade section and the second pitching blade section achieve neutral buoyancy.

6. The variable pitch, hub, and rotor system according to claim 1, wherein the first spar pitch shaft and the second spar pitch shaft each comprise a hollow metal tube surrounded by cementitious material and one or more reinforcing rods within a profile of the respective pitching blade section.

7. The variable pitch, hub, and rotor system according to claim 6, wherein the first pitching blade section and the second pitching blade section achieve neutral buoyancy.

8. The variable pitch, hub, and rotor system according to claim 1, wherein the rotation axis of the first spar pitch shaft and the second spar pitch shaft is located forward of a center of effort of the respective blade such that a failure of an actuation system causes a passive pitch to feather.

9. The variable pitch, hub, and rotor system according to claim 1, wherein the water-lubricated outer pitch bearing and the water-lubricated inner pitch bearing operate in an ambient fluid.

10. The variable pitch, hub, and rotor system according to claim 9, wherein an inside volume of the central fixed hub is flooded with the ambient fluid.

11. The variable pitch, hub, and rotor system according to claim 1, wherein the first spar pitch shaft and the second spar pitch shaft are configured to be inserted or removed from a respective fixed blade section.

12. A marine turbine comprising: a rotor comprising a monolithic fixed blade hub, wherein the monolithic fixed blade hub comprises a central fixed hub and a first fixed blade section and a second fixed blade section, a first blade comprising a first pitching blade section connected to the first fixed blade section by a first spar pitch shaft, wherein the first spar pitch shaft enables the first pitching blade section to rotate about its longitudinal axis relative to the first fixed blade section; a second blade comprising a second pitching blade section adjoined to the second fixed blade section and a second spar pitch shaft passing through the second fixed blade section, wherein the second spar pitch shaft enables the second pitching blade section to rotate about its longitudinal axis relative to the second fixed blade section; and the first fixed blade section and the second fixed blade section each comprise a water-lubricated outer pitch bearing and a water-lubricated inner pitch bearing to allow free rotation of the respective spar pitch shaft.

13. The marine turbine according to claim 12, wherein the monolithic fixed blade hub is made of a moldable cementitious material.

14. The marine turbine according to claim 12, wherein the first spar pitch shaft and the second spar pitch shaft each comprise a cementitious material.

15. The marine turbine according to claim 12, wherein the first spar pitch shaft and the second spar pitch shaft each comprise a metal tube filled with cementitious material.

16. The marine turbine according to claim 15, wherein the first pitching blade section and the second pitching blade section are neutrally buoyant.

17. The marine turbine according to claim 12, wherein the first spar pitch shaft and the second spar pitch shaft each comprise a hollow metal tube surrounded by cementitious material.

18. The marine turbine according to claim 17, wherein the first pitching blade section and the second pitching blade section are neutrally buoyant.

19. A method of generating electricity, the method comprising the steps of: rotating, in a marine environment, a rotor comprising: a monolithic fixed blade hub, wherein the monolithic fixed blade hub comprises a central fixed hub and a first fixed blade section and a second fixed blade section, a first blade comprising a first pitching blade section connected to the first fixed blade section by a first spar pitch shaft, wherein the first spar pitch shaft enables the first pitching blade section to rotate about its longitudinal axis relative to the first fixed blade section; a second blade comprising a second pitching blade section adjoined to the second fixed blade section and a second spar pitch shaft passing through the second fixed blade section, wherein the second spar pitch shaft enables the second pitching blade section to rotate about its longitudinal axis relative to the second fixed blade section; and the first fixed blade section and the second fixed blade section each comprise a water-lubricated outer pitch bearing and a water-lubricated inner pitch bearing to allow free rotation of the respective spar pitch shaft; and converting rotation of the rotor into electrical energy.

* * * * *